J. B. STEWART.
Hay-Fork.
No. 54,435. Patented May 1, 1866.
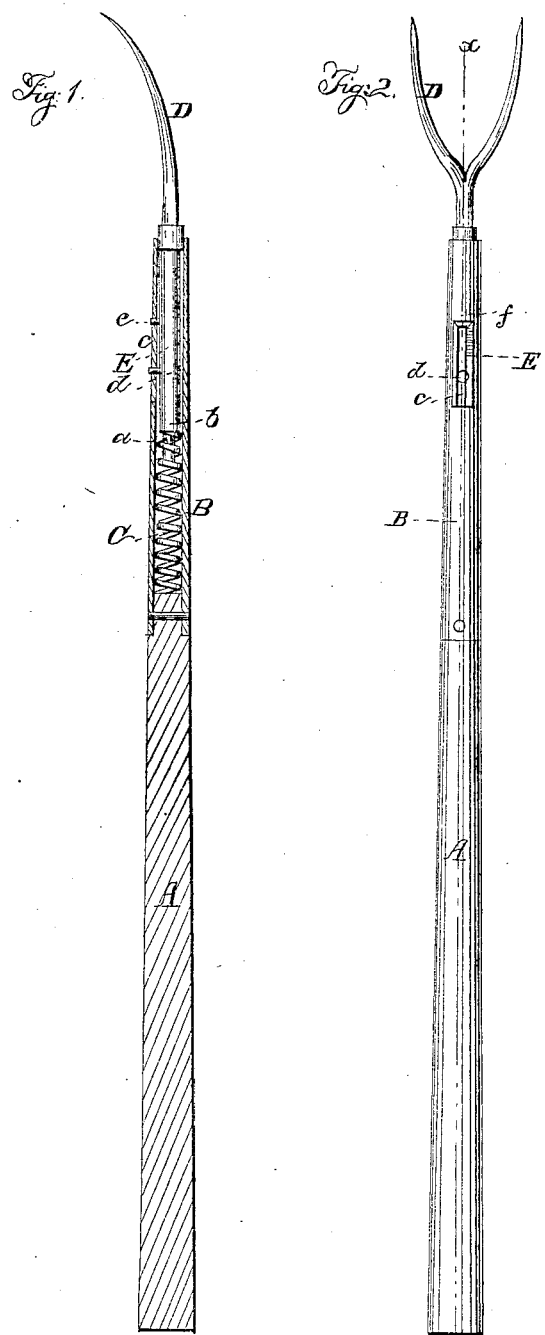
Witnesses.
Inventor.

UNITED STATES PATENT OFFICE.

JOSHUA B. STEWART, OF SOUTH PARIS, MAINE.

IMPROVEMENT IN HAY-FORKS.

Specification forming part of Letters Patent No. 54,435, dated May 1, 1866.

*To all whom it may concern:*

Be it known that I, JOSHUA B. STEWART, of South Paris, Oxford county, State of Maine, have invented a new and useful Improvement in Hay-Forks; and I do hereby declare that the following is a full, clear, and exact description thereof, which will enable others skilled in the art to make and use the same, reference being had to the accompanying drawings, forming part of this specification, in which—

Figure 1 is a longitudinal section of my invention, taken in the line $x\ x$, Fig. 2; Fig. 2, an external view of the same.

Similar letters of reference indicate like parts.

This invention consists in the application of a spring to a hay-fork in such a manner that it will serve as a balance or scale to indicate the weight of the hay taken up on the fork, so that a person in loading a wagon or cart, or in pitching a given quantity of hay from one spot to another, may ascertain the weight thereof.

The invention is more especially designed for farmers and others who frequently dispose of small quantities of hay-jags, and who at present simply guess at the weight when hay-scales are not convenient.

A represents the handle of the fork, constructed of wood, as usual, and B is a metal ferrule secured to the end of the handle, and having within it a spiral spring, C, which bears against the end of the handle A.

D represents the fork, and E the tang thereof, the latter being fitted in the ferrule B, and having its inner end diminished in diameter, as shown at $a$, to fit into the outer end of the spring C, the latter bearing against the shoulder $b$ on the tang formed by $a$. (See Fig. 1.)

The ferrule B has a longitudinal slot, $c$, made in it, through which a pin, $d$, from the tang E projects, to serve as a stop to limit the inward movement of the tang in the ferrule, the outward movement being limited by a pin, $e$, having an index, $f$, on its outer end.

The ferrule B at one side of the slot $c$ is graduated, in order to indicate the compression of the spring C when the fork is raised to an upright position with the hay upon it, the degree of the compression of the spring indicating, of course, the weight of the hay on the fork.

This invention, which is simply the application of the spring-balance to a hay-fork, will prove to be a great acquisition. It may be applied at a small expense.

Having thus described my invention, what I claim as new, and desire to secure by Letters Patent, is—

A hay-fork having a spring-balance or weighing attachment applied to it in the manner substantially as and for the purpose herein set forth.

JOSHUA B. STEWART.

Witnesses:
JOHN DENNETT,
MARY DENNETT.